US008218771B2

(12) United States Patent
Iwamoto

(10) Patent No.: US 8,218,771 B2
(45) Date of Patent: Jul. 10, 2012

(54) INFORMATION PROCESSING APPARATUS AND COMPUTER READABLE MEDIUM

(75) Inventor: Yasuhiko Iwamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1138 days.

(21) Appl. No.: 12/073,006

(22) Filed: Feb. 28, 2008

(65) Prior Publication Data

US 2008/0247551 A1 Oct. 9, 2008

(30) Foreign Application Priority Data

Apr. 5, 2007 (JP) ................................ 2007-099545

(51) Int. Cl.

| | |
|---|---|
| ***H04L 9/00*** | (2006.01) |
| ***H04L 9/08*** | (2006.01) |
| ***H04L 9/32*** | (2006.01) |
| ***H04K 1/00*** | (2006.01) |
| ***G06F 21/00*** | (2006.01) |
| ***H04N 7/167*** | (2011.01) |
| *H04L 9/14* | (2006.01) |
| *G06F 17/00* | (2006.01) |
| *G06F 21/24* | (2006.01) |

(52) U.S. Cl. .......... 380/277; 380/30; 380/201; 380/278; 713/176; 713/186

(58) Field of Classification Search .................. 380/277, 380/201, 278, 30; 713/186, 176

See application file for complete search history.

(56) References Cited

U.S. PATENT DOCUMENTS

2004/0120522 A1* 6/2004 Takeda et al. ................ 380/201
2007/0058803 A1* 3/2007 Suga .............................. 380/30
2007/0061582 A1* 3/2007 Ohmori et al. ............... 713/176

FOREIGN PATENT DOCUMENTS

| | | |
|---|---|---|
| JP | A 5-304614 | 11/1993 |
| JP | A-9-139849 | 5/1997 |
| JP | A-9-233067 | 9/1997 |
| JP | A-2000-307778 | 11/2000 |
| JP | A-2003-126531 | 5/2003 |

(Continued)

OTHER PUBLICATIONS

Baoshi Zhu, Jiankang Wu, Mohan S. Kankanhalli; "Print signatures for document authentication"; Oct. 2003; CCS '03: Proceedings of the 10th ACM conference on Computer and communications security; Publisher: ACM; pp. 145-154.*

*Primary Examiner* — Eleni Shiferaw
*Assistant Examiner* — Courtney Fields
(74) *Attorney, Agent, or Firm* — Oliff & Berridge, PLC

(57) ABSTRACT

An information processing apparatus includes: an acceptance unit that accepts formed information to be formed on a medium and target information to be recorded as an information image together with an image based on the formed information; a specification acceptance unit that accepts specification of the accepted formed information or information concerning the formation result of information image on the medium; an encryption key acquisition unit that acquires an encryption key based on the specified information; an information image generation unit that encrypts the target information using the acquired encryption key, and that generates the information image based on the encrypted target information; and an output unit that outputs a command for forming the information image on the medium together with the image to be formed.

10 Claims, 6 Drawing Sheets

12
11
PROCESSOR UNIT
MEMORY INTERFACE
DVD-ROM ETC
B
PIU
I/F
I/F
15
INTERFACE CIRCUIT
13a
13b
13
14
2
3
1

FOREIGN PATENT DOCUMENTS

| | | | |
|---|---|---|---|
| JP | A-2005-271500 | | 10/2005 |
| JP | 2006018583 A | * | 1/2006 |
| JP | A-2006-511114 | | 3/2006 |
| JP | A-2006-94097 | | 4/2006 |
| JP | A-2006-211202 | | 8/2006 |
| JP | A-2007-5862 | | 1/2007 |
| WO | WO 2004/055757 A1 | | 7/2004 |

* cited by examiner

INFORMATION PROCESSING APPARATUS AND COMPUTER READABLE MEDIUM

CROSS-REFERENCE TO RELATED APPLICATIONS

This application is based on and claims priority under 35 U.S.C. 119 from Japanese Patent Application No. 2007-099545 filed Apr. 5, 2007.

BACKGROUND

1. Technical Field

This invention relates to an information processing apparatus and a computer readable medium.

2. Related Art

To record information on a medium as a computer-readable information image, encrypting of the recorded information is widely adopted.

SUMMARY

According to an aspect of the present invention, an information processing apparatus including: an acceptance unit that accepts formed information to be formed on a medium and target information to be recorded as an information image together with an image based on the formed information; a specification acceptance unit that accepts specification of the accepted formed information or information concerning the formation result of information image on the medium; an encryption key acquisition unit that acquires an encryption key based on the specified information; an information image generation unit that encrypts the target information using the acquired encryption key, and that generates the information image based on the encrypted target information; and an output unit that outputs a command for forming the information image on the medium together with the image to be formed.

BRIEF DESCRIPTION OF THE DRAWINGS

Exemplary embodiment of the present invention will be described in detail based on the following figures, wherein.

DETAILED DESCRIPTION

Figure 1:
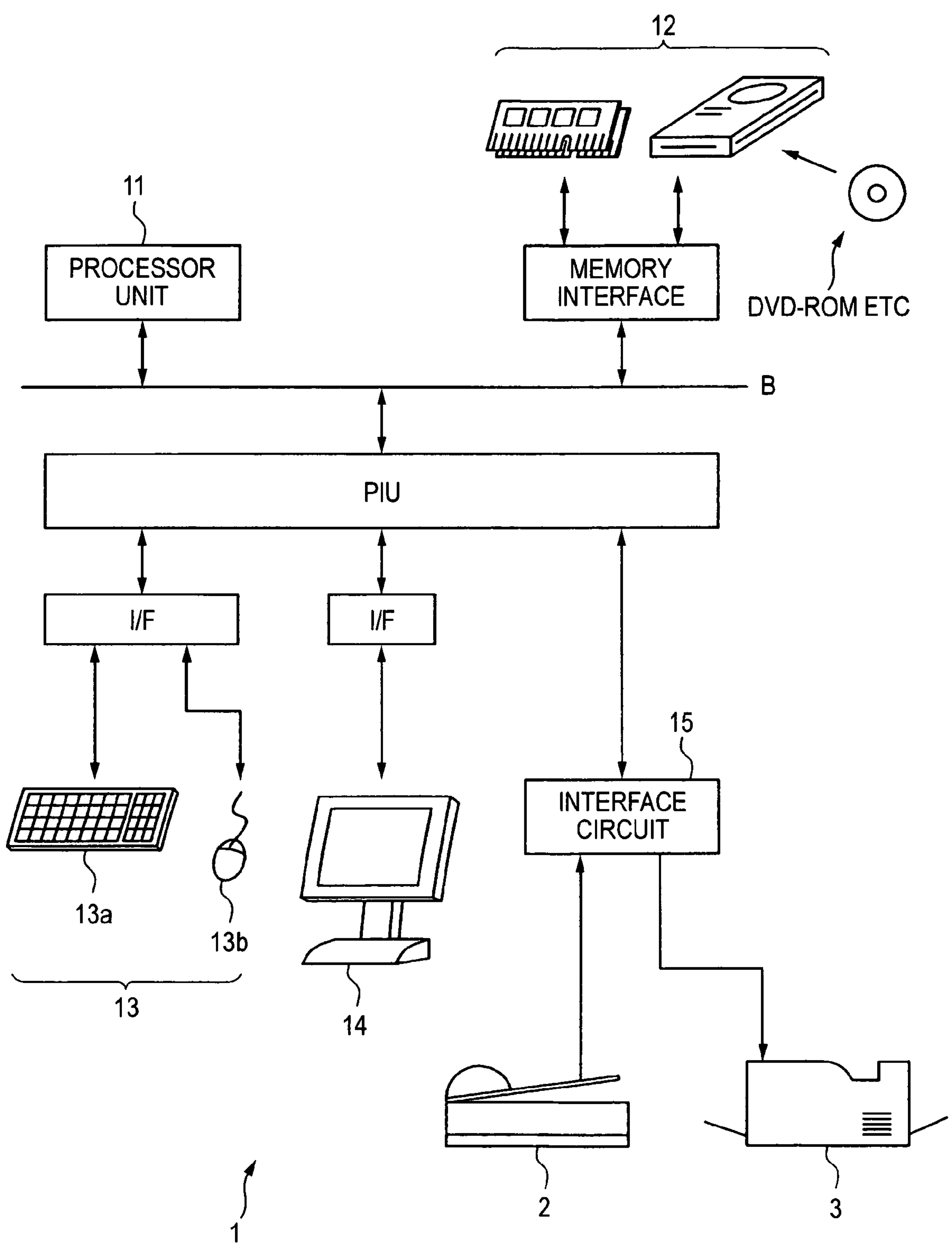
FIG. 1 is a block diagram to represent a configuration example of an information processing apparatus according to an embodiment of the invention.

Referring now to the accompanying drawings, there is shown an embodiment of the invention. An information processing apparatus 1 according to the embodiment is made up of a processor unit 11, a storage unit 12, an operation section 13 including a keyboard 13*a* and a mouse 13*b*, a display 14, and an interface circuit 15, as illustrated in FIG. 1. The processor unit 11 and the storage unit 12 are connected through a main bus B. A peripheral interface unit PIU is connected to the main bus B, and the operation section 13, the display 14, and the interface circuit 15 are connected through the PIU. The PIU also operates as a bus arbiter for arbitrating use of the bus in information transfer among the sections. The information processing apparatus 1 of the embodiment further includes a circuit for generating a clock signal to be input to the processor unit 11 and the like as the whole configuration, but the circuit, etc., is not shown in the figure for simplifying the description.

The information processing apparatus 1 is connected to a scanner 2 and a printer 3 through the interface circuit 15.

FIG. 1 represents an example of the information processing apparatus 1 and the configuration of the information processing apparatus 1 is not limited to it. For example, a disk drive, etc., may be connected through the PIU or may be detachable. The mouse 13*b* may be any other pointing device or may not be included.

The processor unit 11 is a computing element operating in accordance with a program; here it operates in accordance with a program stored in the storage unit 12. In the embodiment, the processor unit 11 generates a medium recording information according to a command of the user. The processor unit 11 reads a medium recording information and performs processing using the information recorded on the medium. A specific processing example of the processor unit 11 is described later in detail.

The storage unit 12 is made up of storage elements of RAM (Random Access Memory), ROM (Read-Only Memory), an external storage drive such as a CD-ROM drive and a DVD drive, and the like, and retains the program executed by the processor unit 11. The program may be provided in a state in which it is stored on a computer-readable record medium such as a DVD-ROM.

The operation section 13, which is a mouse, a keyboard, etc., accepts a command and information entered by the user and outputs them to the processor unit 11. The display 14 is a display, etc., for displaying an image formed on a medium by the user.

The interface circuit 15 is an interface such as a USB (Universal Serial Bus), etc., for example, for transferring information to and from the scanner 2 and the printer 3. The scanner 2 is a scanner of flat bed type, for example, and is provided with a feeder for reading a plurality of original sheets in sequence. Upon reception of a scan start command, the scanner 2 resets a page counter to "1." It feeds originals set on the feeder one at a time to a read plane, optically reads the image formed on the original on the read plane, and outputs image data representing the read result to the interface circuit 15. At this time, the value of the page counter may be output to the interface circuit 15 together with the image data and the page counter may be incremented by one.

The printer 3 is a laser printer, etc., for generating a bit map image based on image data accepted as an objected to be formed and forming the generated image on a medium of paper, etc.

Figure 2:
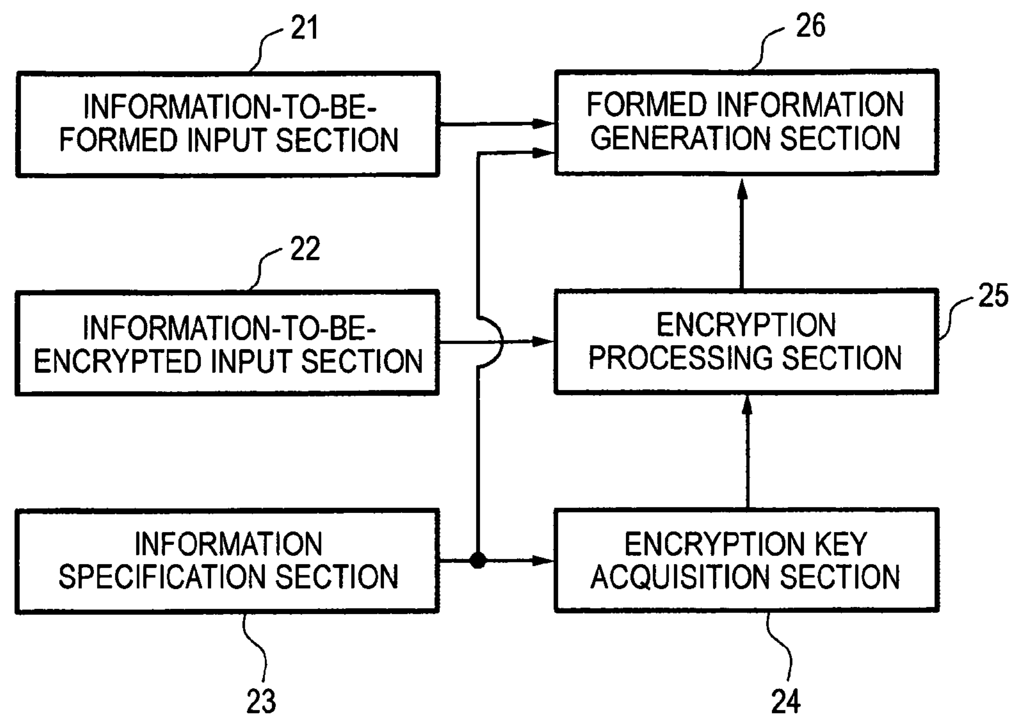
FIG. 2 is a functional block diagram to represent an example of encryption processing of the information processing apparatus according to the embodiment of the invention.

Next, encryption processing of information by the processor unit 11 of the embodiment will be discussed. The processor unit 11 of the embodiment executes encryption processing, whereby the information processing apparatus 1 of the embodiment becomes an apparatus functionally made up of an information-to-be-formed input section 21, an information-to-be-encrypted input section 22, an information specification section 23, an encryption key acquisition section 24, an encryption processing section 25, and a formed information generation section 26, as shown in FIG. 2.

The information-to-be-formed input section 21 accepts input of information, etc., of a document to be formed on a medium. This information, for example, may be information entered through the operation section 13 or information stored in the storage unit 12 may be read and accepted.

The information-to-be-encrypted input section 22 accepts information to be encrypted. This information, like the information to be formed, may be information entered through the operation section 13 or information stored in the storage unit 12 may be read and accepted. The information is encrypted and is formed on a medium together with document information, etc., as a coded information image.

The information specification section 23 accepts specification of the information accepted by the information-to-be-formed input section 21 (called formed information) or information concerning the formation result of an information image on a medium. The information concerning the formation result includes, for example, information representing the formation position of the information image on the medium, information representing the outer shape of the information image (shape, size, etc.,), information representing the page for forming the information image, information representing the number of the information images to be formed on the medium, information concerning a character string contained in the formed information, information of a pattern contained in the formed information, etc.

Figure 3:
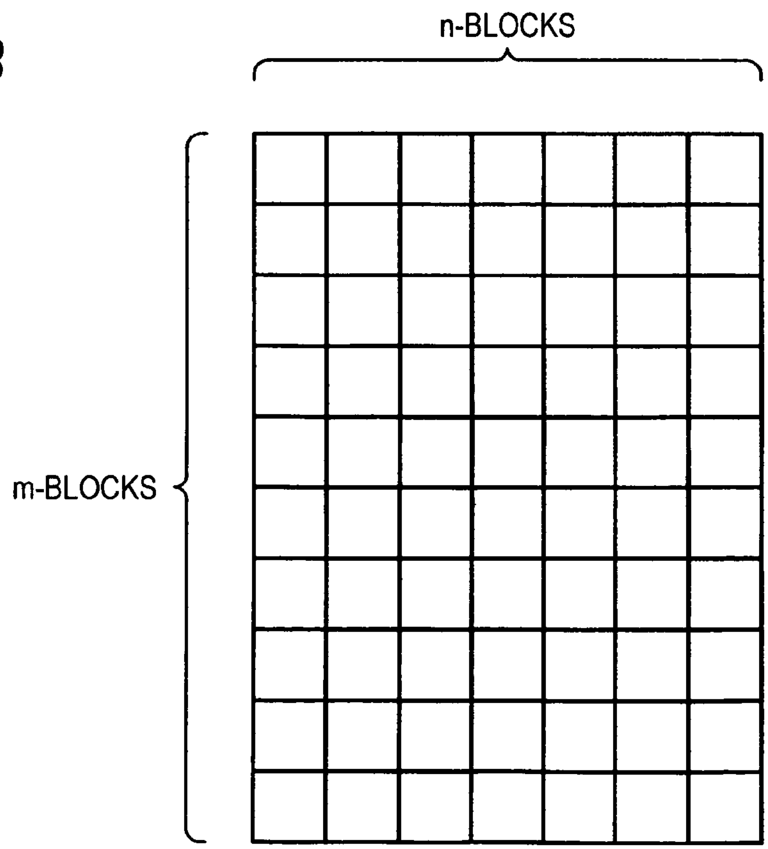
FIG. 3 is a schematic representation to represent an example of blocks to specify the position where an information image is to be placed in the information processing apparatus according to the embodiment of the invention.

The case where specification of the formation position of the information image representing encrypted information on the medium is accepted will be discussed by way of example. The formation position can be specified by dividing a medium into n×m blocks, for example, as illustrated in FIG. 3 and entering information specifying the block representing the formation position (a pair of the block position in the x axis direction and the block position in the y axis direction). Any block can be specified, for example, in such a manner that the block which is the second from the left in the x axis direction and is the third from the top in the y axis direction) is position (2, 3).

The encryption key acquisition section 24 acquires encryption key information based on the information specified in the information specification section 23. For example, the encryption key acquisition section 24 may include a generator for generating an encryption key and may generate encryption key information based on the information specified in the information specification section 23. As a specific example, information of leading 128 bits of a character string contained in formed information may used as a seed and an encryption key may be generated based on the seed.

The encryption key acquisition section 24 may selectively acquire any piece of a plurality of predetermined encryption key information pieces. For example, a plurality of given encryption key information pieces KEi (i=1, 2, . . . ) and decryption key information pieces KDi (i=1, 2, . . . ) provided in a one-to-one correspondence with the encryption key information pieces are previously retained in the storage unit 12. The encryption key acquisition section 24 selects the encryption key used for encrypting the information image from among the encryption keys KEi stored in the storage unit 12.

The encryption key acquisition section 24 selects the encryption key, for example, as follows: Using block specifying information (x, y), $I=m\times(x-1)+y$ is calculated. As an example, when a medium is divided into 5×7 blocks, the value of I corresponding to the block at the position (2, 3) becomes $I=7\times(2-1)+3=10$. The value of I may be calculated as $I=x+n\times(y-1)$. The encryption key acquisition section 24 uses the calculated I value to select the encryption key KEI.

The encryption processing section 25 encrypts the information to be encrypted using the encryption key information acquired in the encryption key acquisition section 24 (for example, the selected encryption key KEI). The encryption method will not be discussed here in detail because any of various methods using the encryption key information can be adopted. The encryption processing section 25 generates a computer-readable information image (code image) such as a bar code (which may be a two-dimensional bar code) from the encrypted information.

The formed information generation section 26 combines the information image generated by the encryption processing section 25 with information of the document whose input is accepted by the information-to-be-formed input section 21 or the like. If the combining position of the information image is specified in the information specification section 23, the specified position (position where the center of the information image is placed at the center of the specified block) is adopted. The formed information generation section 26 outputs the composite image to the printer 3 for forming the composite image on the medium on the printer 3.

Figure 4:
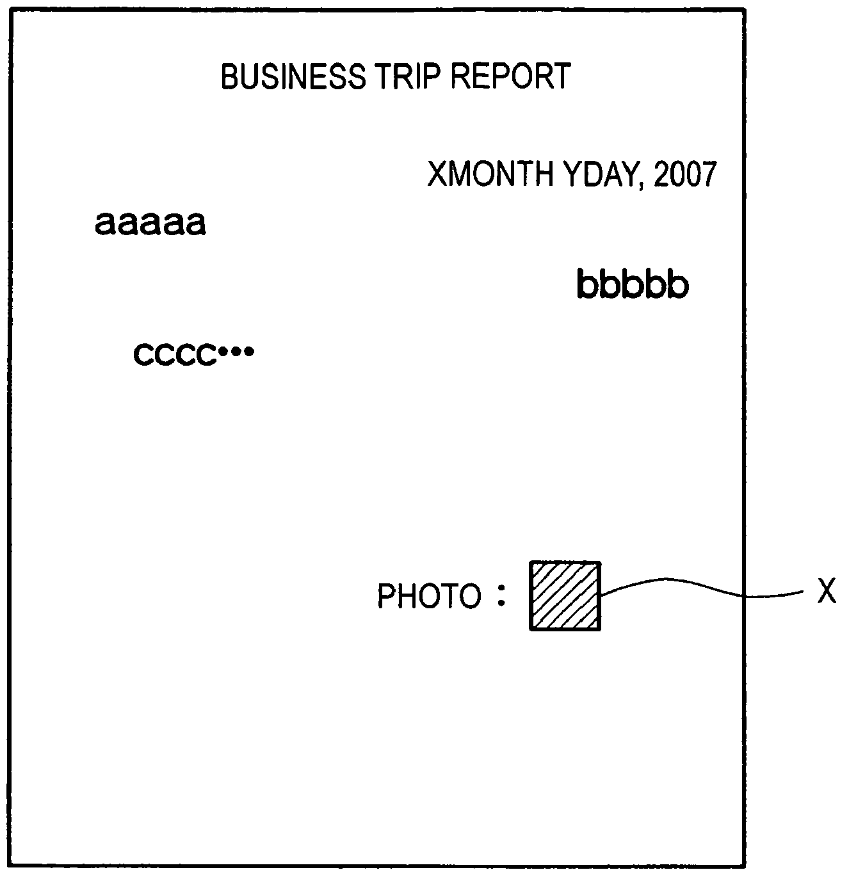
FIG. 4 is a schematic representation to represent an example of an image formed by the information processing apparatus according to the embodiment of the invention.

Accordingly, the composite image containing an information image X representing the encrypted information is formed on the medium as illustrated in FIG. 4. The information represented by the information image is encrypted with the encryption key determined based on the information on the medium where the information is formed, and can be decrypted with the decryption key corresponding to the encryption key.

Figure 5:
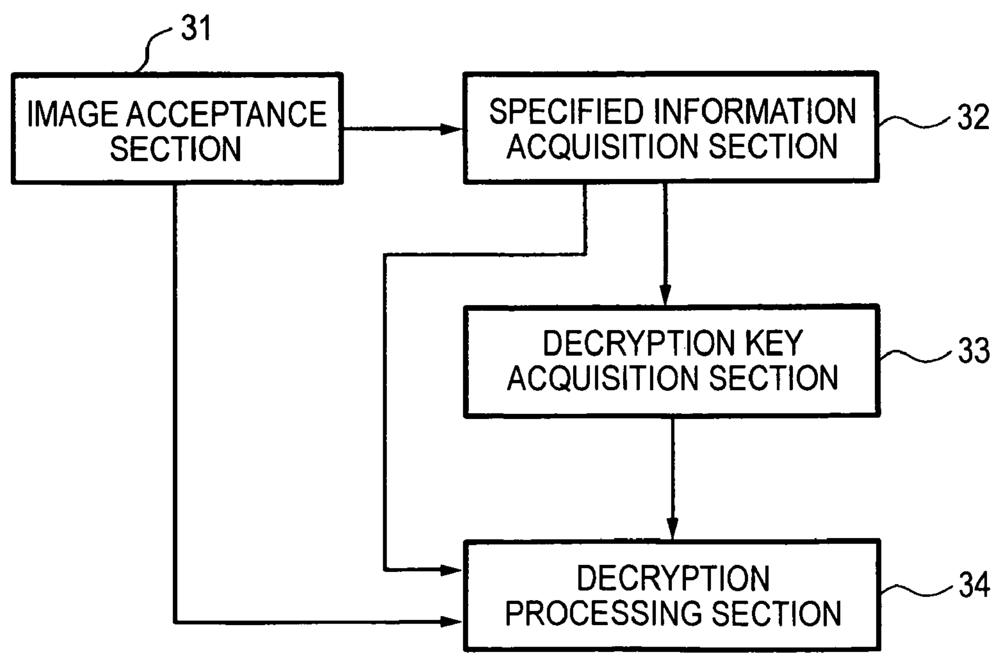
FIG. 5 is a functional block diagram to represent an example of decryption processing of the information processing apparatus according to the embodiment of the invention.

Next, decryption processing of information by the processor unit 11 of the embodiment will be discussed. The processor unit 11 of the embodiment executes decryption processing, whereby the information processing apparatus 1 of the embodiment becomes an apparatus functionally made up of an image acceptance section 31, a specified information acquisition section 32, a decryption key acquisition section 33, and a decryption processing section 34, as shown in FIG. 5.

The image acceptance section 31 commands the scanner 2 to read an original in accordance with a command of the user. It accepts image data recorded on a medium as an original from the scanner 2.

When information represented by an information image is encrypted, the specified information acquisition section 32 acquires information specified as the base of acquiring the encryption key used for the encryption. The information is at least a part of formed information or is information concerning the formation result of the information image on the medium. The information concerning the formation result includes, for example, information representing the formation position of the information image on the medium, information representing the outer shape of the information image (shape, size, etc.,), information representing the page forming the information image, information representing the number of the information images to be formed on the medium, information concerning a character string contained in the formed information, information of a pattern contained in the formed information, etc.

By way of example, if the formation position of the information image representing encrypted information on the medium is specified, the specified information acquisition section 32 divides the image data accepted by the image acceptance section 31 into n×m blocks. It searches partial image data in each block for the information image. This means that the specified information acquisition section 32 checks whether or not the partial image data contained in each block contains the information image. Processing of detecting the information image from the image data is determined for each image type and is widely known processing and therefore will not be discussed here in detail.

If the specified information acquisition section 32 finds out the block containing the information image, it outputs information specifying the block. For example, when the medium is divided into 5×7 blocks, if the information image is contained in the block at the position (2, 3) which is the second from the left and is the third from the top, the specified information acquisition section 32 outputs information of the numeric pair of (2, 3).

As another example, if a part of a character string contained in formed information is specified, the specified character string part is recognized in OCR (optical character recognition) and information of the recognition result is output.

The decryption key acquisition section 33 acquires a decryption key based on the information output by the specified information acquisition section 32. For example, the decryption key acquisition section 33 may include a generator for generating the decryption key corresponding to the encryption key used when the image representing the information image is encrypted and may generate decryption key information based on the information specified in the specified information acquisition section 32. As a specific example, information of the leading 128 bits of the character string contained in the formed information may be taken out from the information output by the specified information acquisition section 32 and may be used as a seed and a decryption key may be generated based on the seed information.

The decryption key acquisition section 33 may selectively acquire any piece of a plurality of predetermined decryption key information pieces. For example, encryption key information KDi (i=1, 2, . . . ) corresponding to decryption key information KEi (i=1, 2, . . . ) is previously retained in the storage unit 12 and upon reception of the information specifying the block containing the information image, the decryption key acquisition section 33 selectively reads decryption key information from the storage unit 12 based on the information. Here, the decryption key information is selected according to the same method as selecting the encryption key.

That is, in selecting the encryption key, $I=m\times(x-1)+y$ is calculated using block specifying information (x, y) and when encryption key KEI is selected, likewise the decryption key KDI corresponding to the encryption key KEI is selected using the value of I.

In selecting the encryption key, when the value of I is calculated as $I=x+n\times(y-1)$, the value of I is used to select the decryption key KDI corresponding to the encryption key KEI.

The decryption processing section 34 reproduces the encrypted information represented by the information image detected by the specified information acquisition section 32. It decrypts the encrypted information using the decryption key acquired by the decryption key acquisition section 33 and outputs the decryption result.

Figure 6:
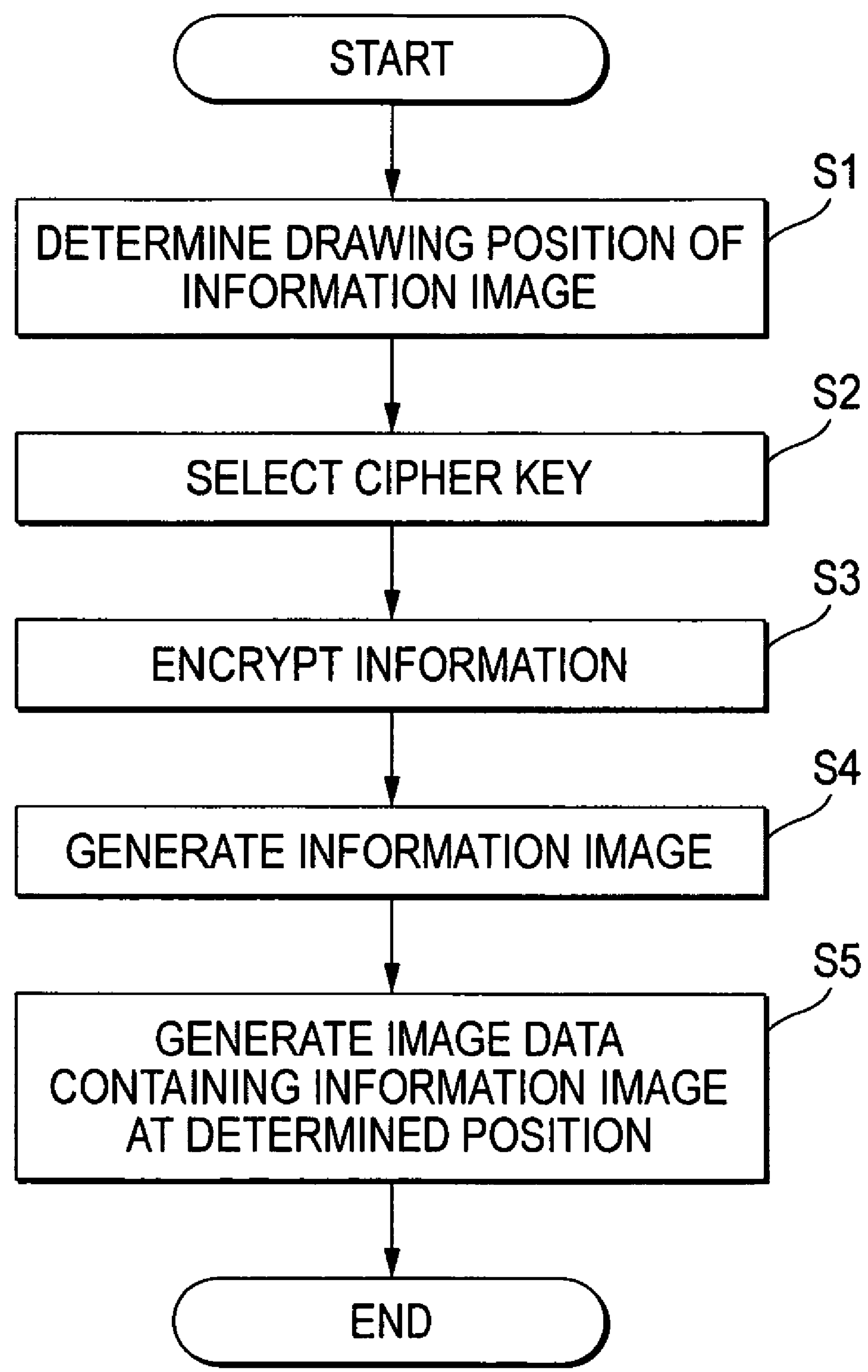
FIG. 6 is a flowchart to represent an example of encryption processing of the information processing apparatus according to the embodiment of the invention.

That is, according to the embodiment, for example, to determine or specify the encryption key and the decryption key according to the drawing position of the information image, input of the information to be encrypted is accepted and processing shown in FIG. 6 is started. First, the drawing position of the information image representing the post-encrypted information is determined (S1). The drawing position is determined by a command of the user, for example. When the drawing position of the information image is determined, any of encryption keys preset in the relationship with the determined drawing position is selected (S2). The selected encryption key is used to encrypt the information to be encrypted (S3). The information processing apparatus 1 generates an information image of a bar code, etc., for representing the encrypted information (S4) and draws the information image at the drawing position determined at S1 on a medium (S5). The drawing result is sent to the printer 3 and the image is formed on the medium on the printer 3.

Figure 7:
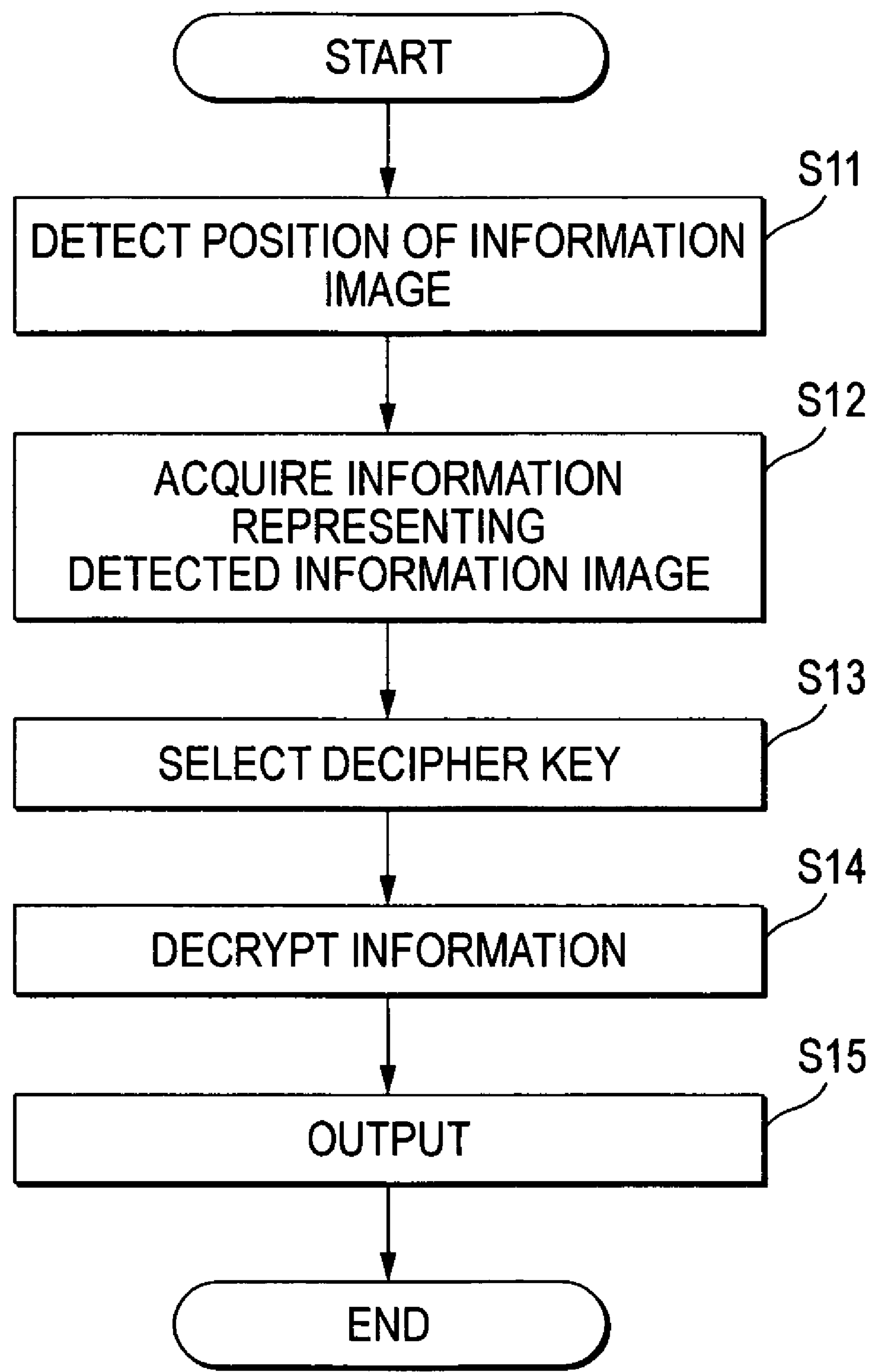
FIG. 7 is a flowchart to represent an example of decryption processing of the information processing apparatus according to the embodiment of the invention.

To decrypt the information from the medium thus formed, the image data provided by reading the medium through the scanner 2 is input to the information processing apparatus 1. The information processing apparatus 1 starts processing shown in FIG. 7 and detects the position of the information image (S11). It reads encrypted information represented by the detected information image (S12). The information processing apparatus 1 selects any of predetermined decryption keys based on the position detected at S11 (S13). It uses the selected decryption key to decrypt the read encrypted information (S14) and outputs the decryption result (S15).

In the description given so far, it is assumed that the encryption key and the decryption key are selected according to the position where the information image is formed on the medium and as an example, the medium is divided into n×m blocks and the encryption key and the decryption key are selected according to which block the information image is formed in. However, the selection method of the encryption key and the decryption key is not limited to it.

Figure 8:
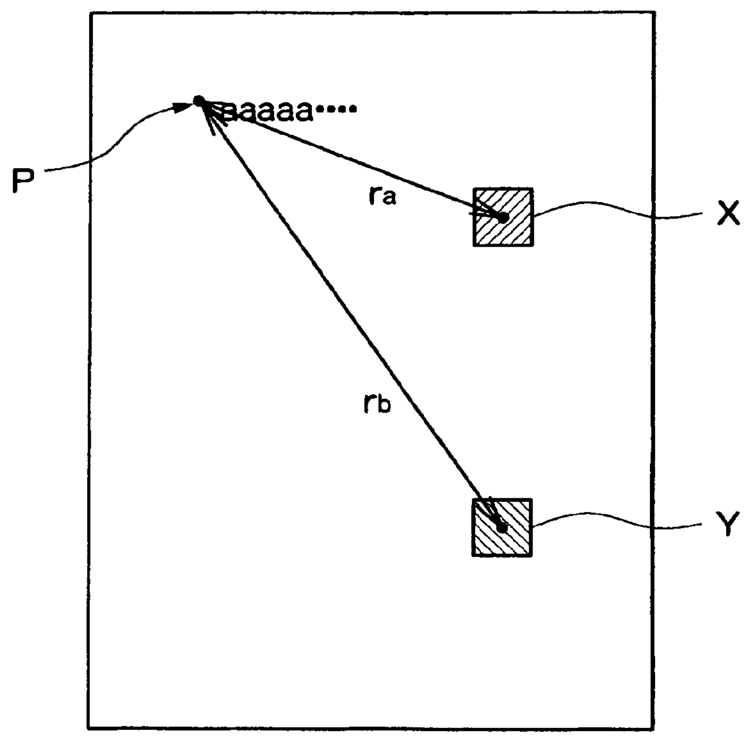
FIG. 8 is a schematic representation to represent another example of information used as reference when a encryption key and a decryption key are selected in the information processing apparatus according to the embodiment of the invention.

For example, as shown in FIG. 8, a reference position P is determined on a medium and the encryption key and the decryption key may be selected based on the distance from the reference position to the center of the information image (ra, rb). The reference position may be, for example, the upper left corner coordinates of information other than the information image formed on the medium (character, line, image, etc., contained in document) or may be the upper left corner of the medium or may be any desired position coordinates on the medium.

The information processing apparatus 1 may select the encryption key KE1 or the decryption key KD1 if the distance from the reference position is less than 11;

the encryption key KE2 or the decryption key KD2 if the distance from the reference position is 11 or more and less than 12;

the encryption key KE3 or the decryption key KD3 if the distance from the reference position is 12 or more.

If a plurality of information images exist, the encryption key and the decryption key corresponding to the information represented by each information image may be selected based on the distance from the reference position of each information image.

To select the encryption key and the decryption key based on the outer shape of a code image, for example, the size, the shape, etc., the information processing apparatus 1 may accept information representing the size, the shape, etc., for example, as information determining the outer shape of the code image from the user and may selectively use the predetermined encryption key corresponding to the accepted information. At the decrypting time, the information processing apparatus 1 recognizes the outer shape of the formed code image and determines the size, the shape, etc., of the code image and then selectively uses the predetermined decryption key corresponding to the information of the determined size and shape.

If a document is made up of a plurality of pages, the encryption key and the decryption key are previously stored in association with information for determining or specifying the page to form an information image (page number, even or odd number of page, remainder resulting from dividing by a predetermined value, or the like). The information processing apparatus 1 receives information for determining or specifying which page an information image is to be formed on from the user, and selectively uses the encryption key associated with the accepted information. At the decrypting time, likewise the information processing apparatus 1 detects the page where the information image is formed, selects the decryption key corresponding to the detected page, and uses the decryption key for decryption processing. In this case, in encryption processing, the page to form an information image is determined, information is encrypted selectively using the predetermined encryption key corresponding to the determined page, and an information image representing the encrypted information is formed within the determined page.

Further, the encryption key and the decryption key may be selected based on the number of information images formed on a medium. In this case, in encryption processing, a plurality of positions each to form an information image are determined. For example, to form a medium into n×m blocks as described above, a plurality of blocks are selected. The block to which each information image belongs is set to an attention block and the number of information images contained in the blocks arranged in the up and down direction or the side-to-side direction of the attention block is counted. The encryption key is selected based on the count value.

Figure 9:
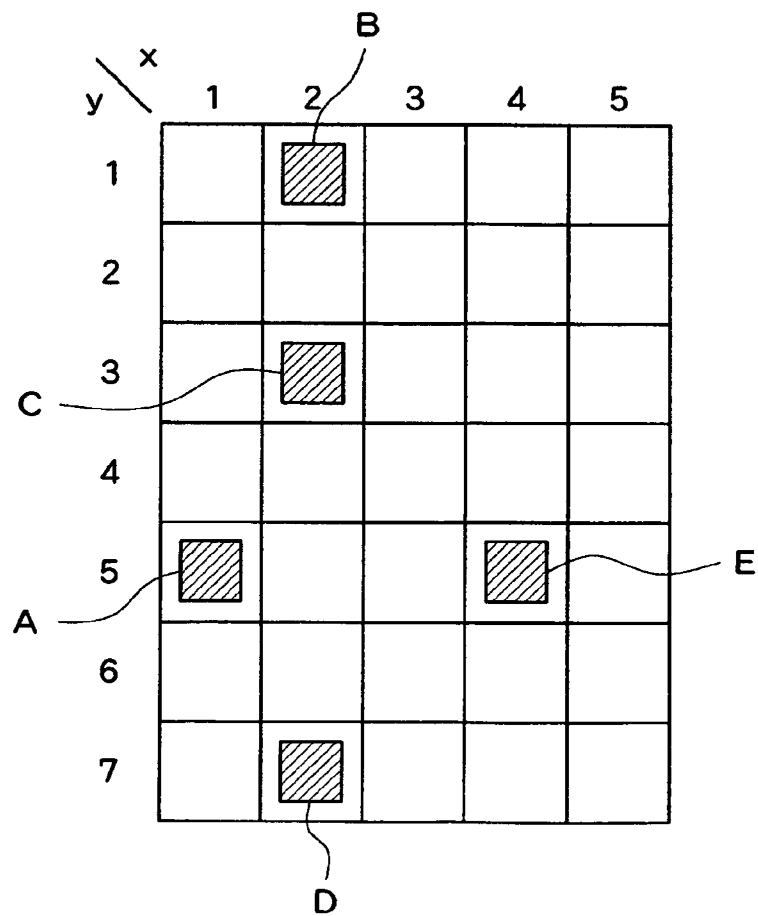
FIG. 9 is a schematic representation to represent still another example of information used as reference when an encryption key and a decryption key are selected in the information processing apparatus according to the embodiment of the invention.

By way of example, the case where information provided by encrypting information A is placed in block (1, 5), information provided by encrypting information B is placed in block (2, 1), information provided by encrypting information C is placed in block (2, 3), information provided by encrypting information D is placed in block (2, 7), and information provided by encrypting information E is placed in block (4, 5) as shown in FIG. 9 will be discussed.

At this time, assuming that the block (4, 5) is set to an attention block, for example, there is no block containing an information image in the up and down direction of the attention block and therefore the number of information images under the column (x=4) is one. Then, the information processing apparatus 1 selects the encryption key KE1 corresponding to "1" and the information E to be contained in the block (4, 5) is encrypted.

Assuming that the block (2, 1) is set to an attention block, there are two additional blocks each containing an information image in the up and down direction of the attention block and therefore the number of information images under the column (x=2) is three. Then, the information processing apparatus 1 selects the encryption key KE3 corresponding to "3" and the information B to be contained in the block (2, 1) is encrypted.

Thus, the information A in the block (1, 5) under the column x=1 and the information E in the block (4, 5) under the column x=4 are encrypted according to the encryption key KE1 corresponding to the number of information images "1." The information B, the information C, and the information D in the blocks (2, 1), (2, 3), and (2, 7) under the column x=2 are encrypted according to the encryption key KE3 corresponding to the number of information images "3."

Here, the blocks in the up and down direction are referenced, but the blocks in the side-to-side direction may be referenced for performing processing in a similar manner. To reference the blocks in the side-to-side direction, assuming that the block (4, 5) is set to an attention block, there is an additional block containing an information image in the side-to-side direction of the attention block. This means that the number of information images in the row (y=5) is two. Then, the information processing apparatus 1 selects the encryption key KE2 corresponding to "2" and the information E to be contained in the block (4, 5) is encrypted.

Assuming that the block (2, 1) is set to an attention block, there is no block containing an information image in the side-to-side direction of the attention block and therefore the number of information images in the row (y=1) is one. Then, the information processing apparatus 1 selects the encryption key KE1 corresponding to "1" and the information B to be contained in the block (2, 1) is encrypted.

In decryption processing, likewise an information image is detected from a medium and information for determining or specifying the block where the information image is detected is acquired. The block to which each detected information image belongs is set to an attention block and the number of information images contained in the blocks arranged in the up and down direction or the side-to-side direction of the attention block is counted. The decryption key is selected based on the count value.

In the example in FIG. 9, similar processing to that in the encryption key is performed. Based on the number of information images arranged in the up and down direction, the information A in the block (1, 5) under the column x=1 and the information E in the block (4, 5) under the column x=4 are decrypted according to the decryption key KD1 corresponding to the number of information images "1." The information B, the information C, and the information D in the blocks (2, 1), (2, 3), and (2, 7) under the column x=2 are decrypted according to the decryption key KD3 corresponding to the number of information images "3."

Based on the number of information images arranged in the side-to-side direction, the information B, the information C, and the information D in the blocks (2, 1), (2, 3), and (2, 7) in the rows y=1, y=3, and y=7 are decrypted according to the decryption key KD1 corresponding to the number of information images "1," and the information A in the block (1, 5) and the information E in the block (4, 5) in the row y=5 are decrypted according to the decryption key KD2 corresponding to the number of information images "2."

Further, in addition to counting the number of information images in the up and down direction or the side-to-side direction, the encryption key and the decryption key may be selected according to the total of the numbers of information images placed in the up and down direction and the side-to-side direction.

Further, the encryption key and the decryption key may be selected based on information other than the information image formed on a medium. For example, the character existing in the upper left corner of a medium may be recognized in OCR (optical character recognition), etc., and the encryption key and the decryption key may be selected according to the result of the recognition. For example, the encryption key and the decryption key corresponding to the value of ASCII code of the recognition result may be selected. A part of Unicode (for example, the top or last one byte) may be taken out and the encryption key and the decryption key corresponding to the value represented by the part may be selected.

In addition, the encryption key and the decryption key may be selected using the title given to the information formed on a medium, the number of paragraphs (that can be counted by performing recognition processing of layout in OCR), the number of characters contained in the first paragraph, the position of the first period (full stop in Japanese) appearing in the described character string (the number of characters from the top of the character string), the position coordinates of the end point of pattern information, the number of patterns, or any other information.

In the embodiment, the encryption key and the decryption key may be common (if a common key system is used) or may be different. The selection methods of the encryption key and the decryption key described above may be adopted in any desired combination.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A system comprising:

a processor;

a memory; and an image forming device, the processor configured to carry out instructions comprising:

accepting document information and target information which is an object of encryption;

accepting specification of information representing a formation position on a medium at which an information image based on the target information is formed;

acquiring an encryption key based on the specified information;

encrypting the target information using the acquired encryption key, and generating the information image based on the encrypted target information; and outputting a command to the image forming device for forming the information image on the medium together with the image to be formed, wherein acquiring the encryption key includes generating and acquiring encryption key information based on the specified information.

2. The system as claimed in claim 1, wherein the information for representing the formation position is at least either information determining a block in a case where the medium is virtually divided into blocks having a predetermined size, or information representing the distance from a reference position provided on the medium.

3. The system as claimed in claim 1, wherein the accepting specification includes accepting at least one of predetermined information or the information regarding the formation result of the information image on the medium, and the predetermined information comprises:

the outer shape of the information image;

the page for forming the information image;

the number of the information images to be formed on the medium;

information regarding a character string contained in the formed information; and information regarding a pattern contained in the formed information.

4. The system as claimed in claim 1, wherein the acquiring an encryption key includes acquiring any of a plurality of given encryption key information pieces based on the specified information.

5. A system comprising:

a processor; and a memory, the processor configured to carry out instructions comprising:

accepting a medium where an information image representing encrypted information is formed, and reading the information image on the medium;

detecting a formation position of the information image on the medium and acquiring a decryption key based on the formation position; and decoding the information represented by the read information image using the acquired decryption key, and outputting the decoded information, wherein acquiring the decryption key includes generating and acquiring decryption key information based on specification of information representing the formation position on the medium at which the information image representing encrypted information is formed.

6. The system as claimed in claim 5, wherein the acquiring the decryption key includes selecting one of a plurality of given decryption key information pieces.

7. The system as claimed in claim 5, wherein the formation position of the information image includes at least either information determining a block in a case where the medium is virtually divided into blocks having a predetermined size, or information representing the distance from a reference position provided on the medium.

8. The system as claimed in claim 5, wherein detecting a formation position of the information image includes detecting at least one of predetermined information from the image formed on the medium, and acquiring the decryption key based on the detected information, and the predetermined information comprises:

information representing the outer shape of the information image;

information regarding the page for forming the information image;

information representing the number of the information images to be formed on the medium;

information regarding a character string contained in the formed information; and information regarding a pattern contained in the formed information.

9. A non-transitory computer readable medium storing a program causing a computer to execute a process for generating an encryption key and a decryption key to decrypt information from image information recorded on a medium, the process comprising:

accepting document information and target information which is an object of encryption;

accepting specification of information representing a formation position on a medium at which an information image based on the target information is formed;

acquiring an encryption key based on the specified information;

encrypting the target information using the acquired encryption key, and generating the information image based on the encrypted target information; and outputting a command to the image forming device for forming the information image on the medium together with the image to be formed, wherein acquiring the encryption key includes generating and acquiring encryption key information based on the specified information.

10. A non-transitory computer readable medium storing a program causing a computer to execute a process for generating an encryption key and a decryption key to decrypt information from image information recorded on a medium, the process comprising:

accepting a medium where an information image representing encrypted information is formed, and reading the information image on the medium;

detecting a formation position of the information image on the medium and acquiring a decryption key based on the formation position; and decoding the information represented by the read information image using the acquired decryption key, and outputting the decoded information, wherein acquiring the decryption key includes generating and acquiring decryption key information based on specification of information representing the formation position on the medium at which the information image representing encrypted information is formed.

* * * * *